United States Patent [19]

Tanaka et al.

[11] Patent Number: 4,947,442
[45] Date of Patent: Aug. 7, 1990

[54] METHOD AND APPARATUS FOR MATCHING FINGERPRINTS

[75] Inventors: Kazue Tanaka; Naoya Ohta, both of Tokyo, Japan

[73] Assignee: NEC Corporation, Tokyo, Japan

[21] Appl. No.: 356,047

[22] Filed: May 24, 1989

[30] Foreign Application Priority Data

May 24, 1988 [JP] Japan ................................. 63-127826
May 24, 1988 [JP] Japan ................................. 63-127827

[51] Int. Cl.$^5$ .............................................. G06K 9/62
[52] U.S. Cl. ..................................................... 382/5
[58] Field of Search ..................... 382/2, 5; 340/825.34

[56] References Cited

U.S. PATENT DOCUMENTS

| | | | |
|---|---|---|---|
| 4,135,147 | 1/1979 | Riganati et al. | 382/5 |
| 4,151,512 | 4/1979 | Riganati et al. | 382/5 |
| 4,747,147 | 5/1988 | Sparrow | 382/5 |
| 4,752,966 | 6/1988 | Schiller | 382/5 |
| 4,783,823 | 11/1988 | Tasaki et al. | 382/2 |

OTHER PUBLICATIONS

K. Morita & K. Asai, "Hybrid Image Processing", 4/1-2/86, pp. 174-181, reprint from the Proceedings of SPIE-The International Society for Optical Engineering.

*Primary Examiner*—Leo H. Boudreau
*Attorney, Agent, or Firm*—Sughrue, Mion, Zinn, Macpeak & Seas

[57] ABSTRACT

A method and apparatus for matching fingerprints is provided in which the collation rate is improved by using both characteristic and non-characteristic minutia for the collation process. An image processing unit used in the apparatus cannot determine whether the collation minutia searched are characteristic or non-characteristic since an IC card holds a list of collation minutia records, thus offering improved security. Further, random numbers may be utilized for accessing the collation minutia record list for further improved security.

4 Claims, 7 Drawing Sheets

PERSONAL FINGERPRINT DATA

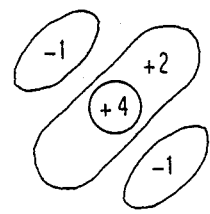
FIG. 8  CASE OF d=4
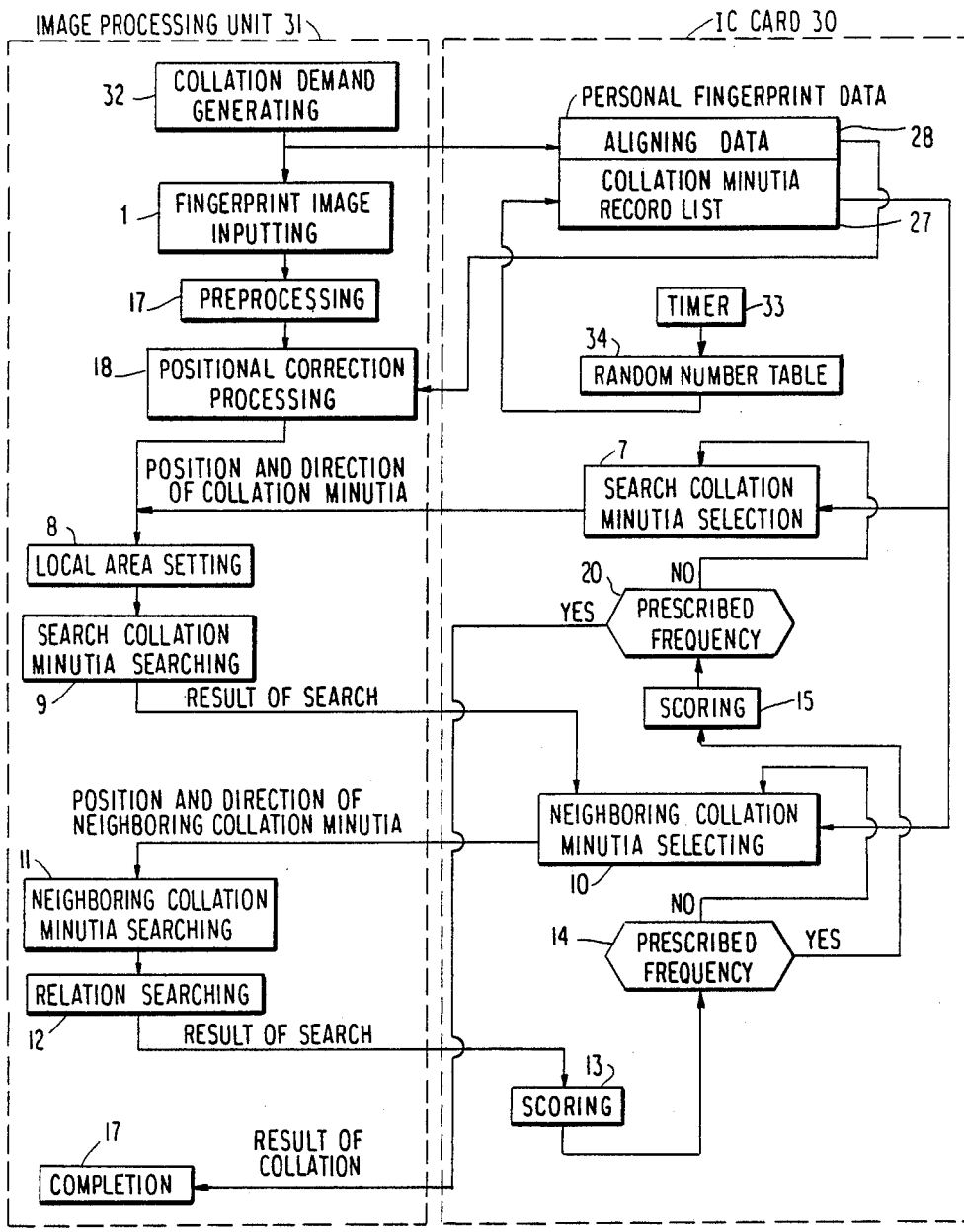
FIG. 9

METHOD AND APPARATUS FOR MATCHING FINGERPRINTS

BACKGROUND OF THE INVENTION

The present invention relates to a method and an apparatus for matching fingerprints.

The principle of the prior art concerning the matching of fingerprints is as follows. A fingerprint is composed of lines known as ridges, which have branching parts (bifurcations) and abrupt endings (end points). These bifurcations and end points are known as minutiae. Two fingerprints will be identified with one another if the positions of and relations among pairs of such points match each other as a rule without excess or deficiency.

For details of a fingerprint matching apparatus based on this principle, reference may be made to the U.S. Pat. No. 4,646,352. When a fingerprint is registered with such apparatus it extracts, and files, the minutiae and inter-minutia relations from the fingerprint to be registered. In collating a newly inputted fingerprint image, its minutiae and interminutia relations are extracted, and the extracted minutiae and their relations are compared with those of filed fingerprints to determine whether the new fingerprint can be identified with one of the filed fingerprints.

This apparatus, however, requires a vast quantity of calculations to extract minutiae and their relations from each fingerprint image.

Therefore, this apparatus proves highly useful in criminal investigations using a large general-purpose computer or a supercomputer in which a suspect is to be identified by the fingerprints left by the offender.

However, where the fingerprint of the individual to be identified is already known, such as in entrance control, and a fingerprint presented for entrance clearance by that particular individual is to be collatted with his or her registered fingerprint, quick processing low-cost processing apparatus with modest computing capacity is required.

For a technology meeting this requirement, reference may be made to Koichiro Morita and Ko Asai, "Automatic fingerprint identification terminal for personal verification" in *PROCEEDINGS OF SPIE - The International Society for Optical Engineering*, Society of Photo-Optical Instrumentation Engineers, 1986, pp. 174–181. The terminal described in this literature, at the time of registration when no particularly quick processing is demanded, executes the processing to extract minutiae and their relations to prepare and file a list of the minutiae of the fingerprint to be registered. On the other hand, at the time of collation when high-speed processing is needed, information on the minutiae in the filed list is referenced, the presence or absence of the minutiae referred to in the inputted fingerprint image is checked and, if they are present, the number of ridges is counted as representing the relations among the minutiae. Then the inputted fingerprint is collated according to the presence or absence of the minutiae and the number of ridges to identify it, or deny its identity, with the registered fingerprint.

Thus collation by a processing apparatus with limited computing capacity uses a method to check whether the minutiae stated in the list of registered minutiae are present and, if they are, whether the number of ridges in every pair of such minutiae is equal to what is registered.

Therefore, this method has a first disadvantage of recognizing an identity and processing accordingly as long as the minutiae registered in the list of minutiae are present and the number of ridges between every pair of minutiae is equal to what is registered even though the inputted fingerprint has minutiae which should not be in the registered one. In other words, it is highly possible that wrong recognition may occur because of the absence of collation information in the area where no minutiae are present.

There is another disadvantage, which concerns security. It is supposed here that a mechanism requiring the execution of collation and the result thereof is not capable of detecting aforementioned minutiae and of counting the number of ridges between them. Such an apparatus exists having such capabilities exists external to the mechanism, but the possible leak of the contents of the minutia list out of the mechanism should be prevented.

A first specific example of this situation may be a case in which a person desiring access to an IC card is to be identified by his or her fingerprint.

Usually, an integrated circuit built into an IC card has no video processing capability due to a variety of constraints. Moreover, an available external apparatus is likely to be too small a terminal unit to be able to quickly prepare a list of minutiae from an inputted fingerprint image.

There is the disadvantage that, in this situation, providing the list of minutiae registered in the IC card to the external apparatus would make it impossible for the identification function to be performed.

A second specific example concerns a system in which a center for concentrated management of the lists of registered minutiae and terminal units installed where entrance control is performed are linked by communication lines.

None of the terminal units in this system would be capable of quickly preparing a list of minutiae from an inputted fingerprint image. Further there might be the disadvantage that it is not always possible to send the inputted fingerprint image to the center because of line capacity.

SUMMARY OF THE INVENTION

A main object of the present invention is to provide a method and an apparatus for the matching of fingerprints free from the foregoing disadvantages and offering an improved in collation rate.

Another object of the invention is to provide a method and an apparatus for the matching of fingerprints free from the foregoing disadvantages and offering improved security.

A method for the matching of fingerprints according to a first aspect of the present invention comprises:

an inputting step to enter a fingerprint image, and a collating step to check the collation minutiae of the input fingerprint image, consisting of both characteristic and non-characteristic minutiae, with the collation minutiae already registered in a list of collation minutia records.

An apparatus for the matching of fingerprints according to a second aspect of the invention comprises:

an IC card having minutia record holding means for holding collation minutiae consisting of both characteristic and non-characteristic minutiae, and sending means for sending collation minutia information from the minutia record holding means to an image processing unit, and the image processing unit having collation minutia searching means responsive to the collation minutia information from the sending means of the IC card for searching the collation minutiae and sending the result of search to said IC card.

An apparatus for the matching of fingerprints according to a third aspect of the invention is an apparatus according to said second aspect of the invention wherein the minutia record holding means in the IC card is accessed using random numbers.

An apparatus for the matching of fingerprints according to a fourth aspect of the invention is an apparatus according to said second aspect of the invention wherein the IC card sets the permissible frequency of sending by said sending means in response to the result of a search from the collation minutia searching means of said image processing unit at any desired value greater than a predetermined level.

BRIEF DESCRIPTION OF THE DRAWINGS

Features and advantages of the present invention will become more apparent from the following detailed description when taken in conjunction with the accompanying drawings, in which:

FIGS. 5 to 8 are diagrams for describing the preprocessing 17 of the preferred embodiments of the invention; and FIG. 9 illustrates a second preferred embodiment of the invention.

In the figures, the same reference numerals denote respectively the same constituent elements.

DETAILED DESCRIPTION OF THE PREFERRED EMBODIMENTS

First will be described how the first disadvantage referred to in BACKGROUND OF THE INVENTION can be obviated.

With regard to the reduced rate of recognition, the problem with collation by the aforementioned processing apparatus with reduced computing capability lies in the identification merely by the presence of minutiae and the number of ridges in each pair of minutiae. A feature of the present invention which resolves this problem is its use of the detected absence of minutiae or of relations in any pair of minutiae for the collating purpose.

Figure 3:
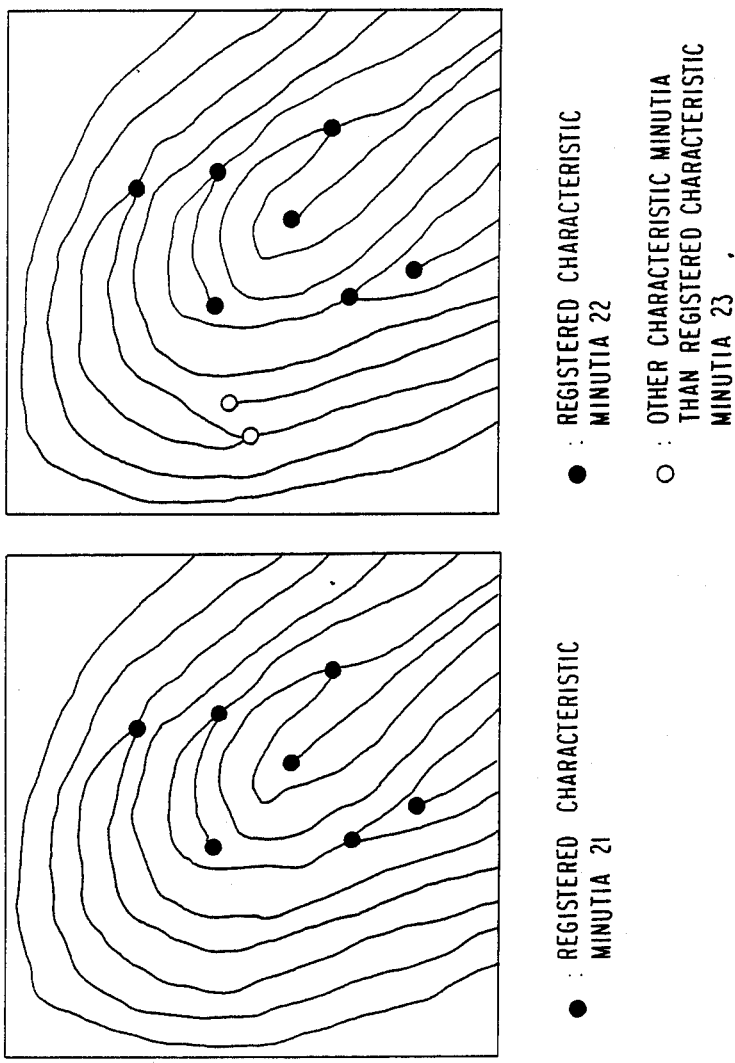
FIGS. 3A, 3B, 4A and 4B are diagrams for describing how a fingerprint is collated.

In a registered fingerprint image shown in FIG. 3A, black circles represent registered characteristic minutiae 21 used for collation.

It is supposed that a fingerprint image as shown in FIG. 3B, for instance, has been entered. This input fingerprint image has all the characteristic minutiae 21 of the fingerprint image in FIG. 3A, i.e. registered characteristic minutiae 22 shown in FIG. 3B, and non-registered characteristic minutiae 23, represented by white circles and not shown in the fingerprint image of FIG. 3A. Therefore, the fingerprint image of FIG. 3A and that of FIG. 3B are not identical. By the conventional collating method, however, only the registered characteristic minutiae 21 of FIG. 3A are searched. Therefore, the two fingerprints are treated as being identical because the registered characteristic minutiae 21 of FIG. 3A exist in FIG. 3B as minutiae 22.

A feature of the present invention is its use of information on non-characteristic minutiae in addition to that on characteristic minutiae.

Figure 4:
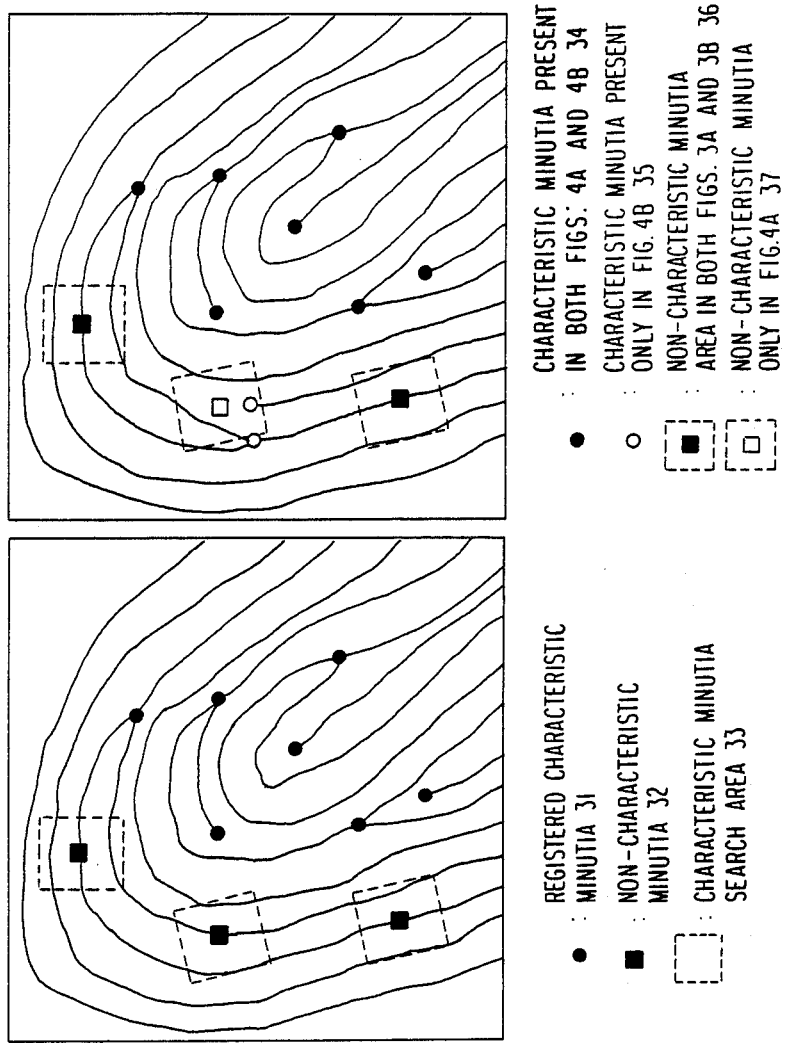

In a fingerprint image such as that shown in FIG. 3A, for instance, minutiae represented by black squares in FIG. 4A are supposed to be non-characteristic minutiae 32. In a collating operation, the positions of given non-characteristic minutiae are searched together with their vicinities in view of possible deviations, and the absence of characteristic minutiae is confirmed in those characteristic minutiae search areas 33. Therefore, if a fingerprint pattern such as that shown in FIG. 3B is given, areas corresponding to the characteristic minutiae search areas 33 will be searched, This results in the discovery of characteristic minutiae 35, which are absent in the fingerprint image of FIG. 4A, in a non-characteristic minutia surrounding area 37. Area 37 is represented in FIG. 4B by a broken-line square having a white square within it.

Next will be described in detail a preferred embodiment of the present invention with reference to drawings.

First, to illustrate the collating procedure characterizing the invention, an example of personal fingerprint data generation phase will be described.

Figure 1:
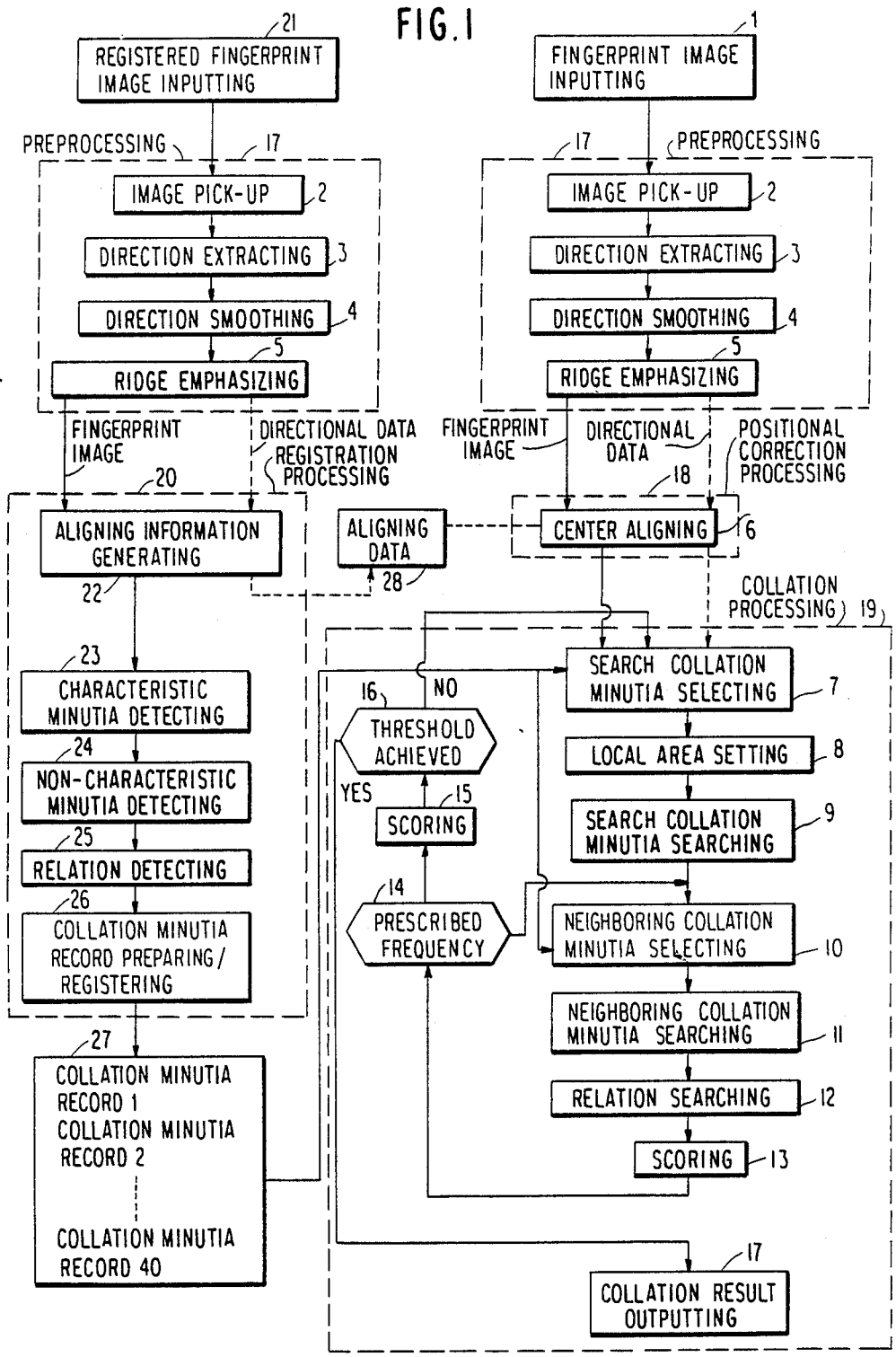
FIG. 1 illustrates a first preferred embodiment of the invention.

Referring to FIG. 1, this example of personal fingerprint data generation phase consists of a registered fingerprint image inputting step 21; preprocessing 17 further comprising steps of image pick-up 2, direction extracting 3, direction smoothing 4 and ridge emphasizing 5; and registration processing 20 further comprising steps of aligning information generating 22, characteristic minutia detecting 23, non-characteristic minutia detecting 24, relation detecting 25 and collation minutia record preparing/registering 26. The collating points in this context include non-characteristic minutia as well as characteristic minutia comprising end points and bifurcations.

Figure 5:
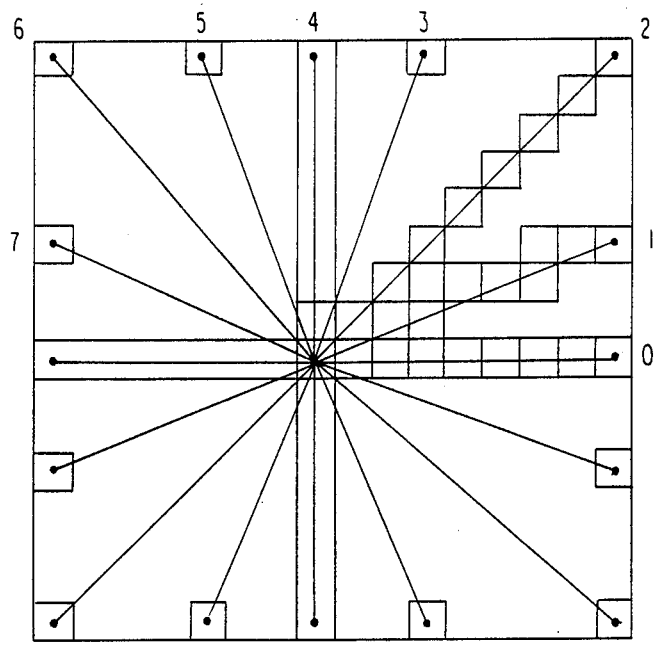
Figure 6:
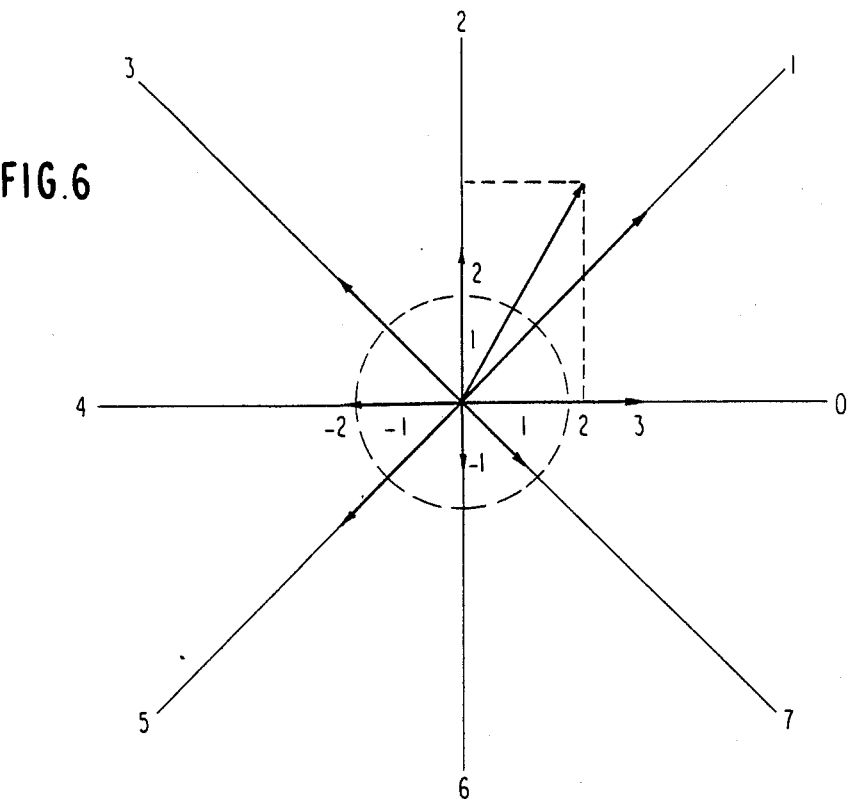

This example of fingerprint data generating phase begins with the step 21 of inputting a fingerprint image to be registered. At this step 21, the fingerprint image can be taken either by dipping the fingertip in ink and sampling its image or by a "total reflection method". Such method utilizes the total reflection phenomenon occurring on the boundary between a prism surface and the finger-print ridges of a finger placed on that prism surface to obtain a fingerprint image at a high signal-to-poise ratio. Then, at the image pick-up step 2, the fingerprint image is optically read, converted into electric signals and stored into a memory as image data. The directions of ridges are extracted from the image data thereby picked up at the direction extracting step 3. After that, the absolute values of the differences between the gray scale values of three-pixel sets, arranged on radial lines emanating in eight directions from a central (8, 8) pixel in each local area of $16 \times 16$ pixels shown in FIG. 5, and the gray scale value of the central pixel are summed. The direction of the least of the absolute values of- the stated difference is supposed to be the direction of stream lines in local areas.

Then at the direction smoothing step 4, the directions of ridges are so adjusted as to be continuous into each adjoining block.

Figure 7:
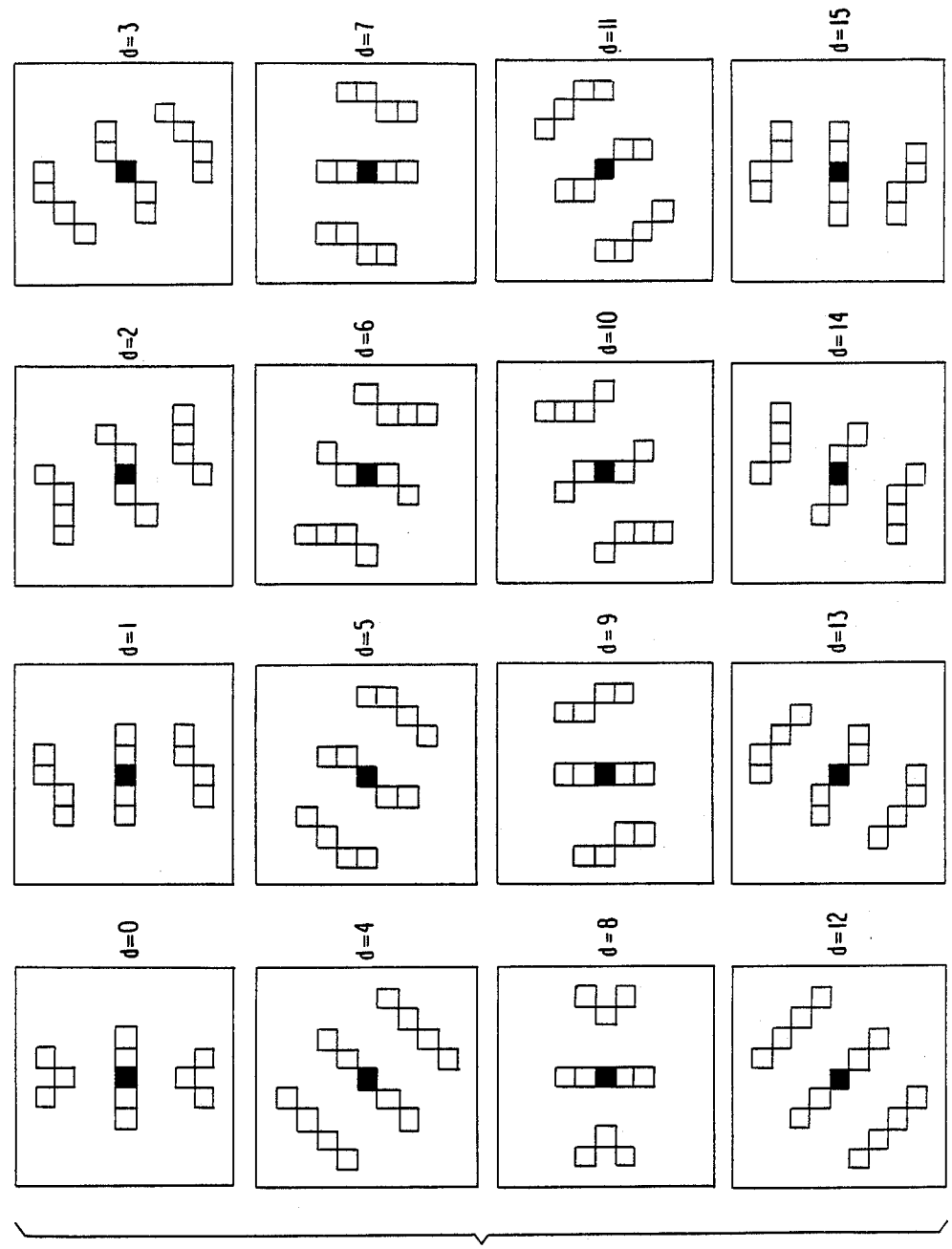

Then at the ridge emphasizing step 5, ridges are filtered and emphasized on the basis of the directions of the extracted ridges. Thus, for every pixel in the direction-extracted and direction-smoothed local areas, a filter conforming to the ridge direction, as shown in FIG. 7, is weighted as illustrated in FIG. 8 to emphasize the gray scale contrast dependent on direction.

At the aligning information generating step 22, 5×5 blocks are selected in which the directions of ridges markedly vary. Thus, in order to achieve reference position alignment between the registered fingerprint and the input fingerprint in collation processing 19 referred to in FIG. 1, 5×5 directional patterns are selected from 16×16 directional patterns on the registered fingerprint image.

Then, at the characteristic minutia detecting step 23, the positions and directions of characteristic minutiae are detected. Thus, the positions of end points and bifurcations on a binary image are detected by scanning the binary image block by block, resulting from the binarization of a gray scale image out of 256×256 pixels stored in an image memory. The directions thereby detected are identical with those determined at the direction smoothing step 4 for the respective blocks to which the detected characteristic minutiae belong. A collation minutia number is assigned to each detected characteristic minutia.

Next at the non-characteristic minutia detecting step 24, non-characteristic minutiae are detected in the following manner. A non-characteristic minutia is defined as the center of an area of a prescribed size in which no characteristic minutia is present. To detect a non-characteristic minutia, the central point of an area having no characteristic minutia is searched for by the same operation as that conducted at the characteristic minutia detecting step 23. Its direction is identical with that determined at the direction smoothing step 4 for the area to which the detected non-characteristic minutia belongs. A collation minutia number is also assigned to each detected non-characteristic minutia.

At the relation detecting step 25, four quadrants are determined, with one of the collation minutiae detected for a collation minutia number i being selected as the original. Out of the characteristic minutiae detected in each quadrant, the closest one to the original is selected. In the absence of a characteristic minutia in a quadrant, the closest non-characteristic minutia to the characteristic minutia of the original is determined. The characteristic minutia or non-characteristic minutia of each quadrant determined in this manner is called a neighboring collation minutia, referred to by the neighboring collation minutia number which is the applicable collation minutia number i.

If the collation minutia of the original and its neighboring collation minutia are characteristic minutiae, the number of ridges linking the two minutiae will be the relation value. In any other case, the value is "0".

Figure 2:
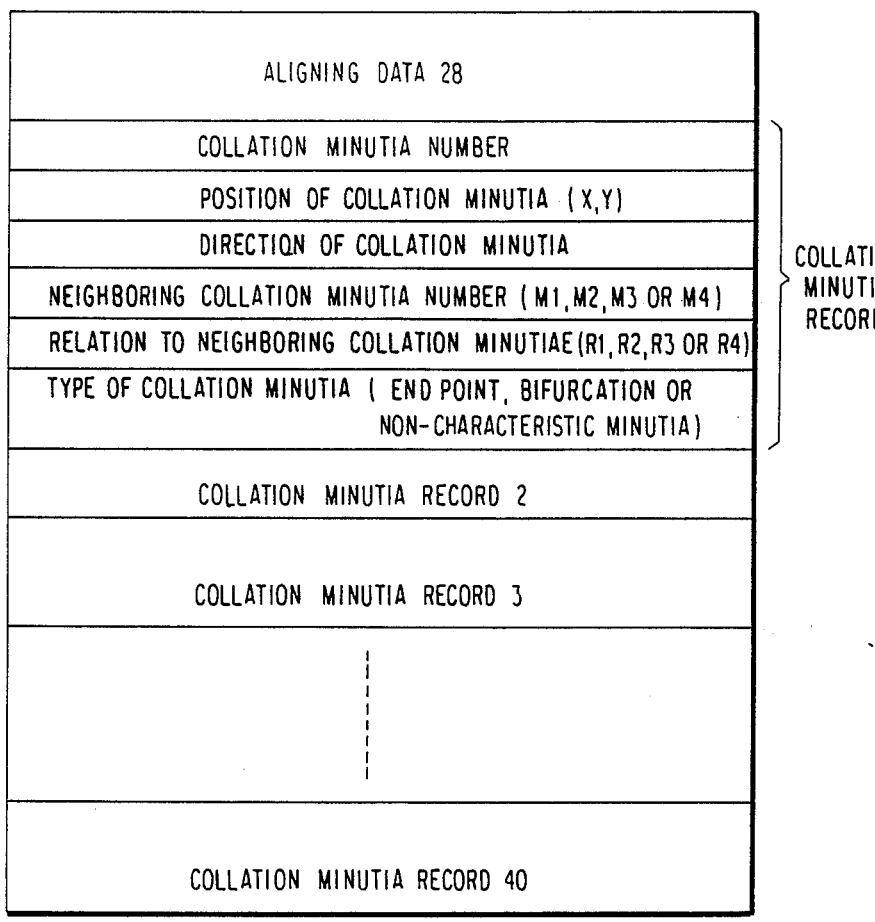
FIG. 2 shows personal fingerprint data prepared by the first preferred embodiment of the invention.

After this processing, a collation minutia record list 27 shown in FIG. 2 is formed at the collation minutia record preparing/registering step 26. This list 27 has an average of 40 records for each fingerprint.

In the collating phase of the embodiment of the present invention, in which the object is to identify individuals, personal fingerprint data consisting of the collation minutia record list 27, registered in the above described personal fingerprint data generating phase and aligning data 28, are collated on a one-to-one basis with the input fingerprint entered by the registrant at the time of collation. Therefore, the embodiment of the invention uses a "top-down collating system", by which the registrant enters his or her ID number or a reasonable substitute therefor at the time of collation. The personal fingerprint data 27 and 28 pertaining to the registered fingerprints are accessed, and the characteristics of the registered fingerprints covered by the data are read out, resulting in direct verification on the input fingerprint image.

An example of collating phase of the preferred embodiment of the invention comprises a fingerprint image inputting step 1; preprocessing 17 further comprising steps of image pick-up 2, direction extracting 3, direction smoothing 4 and ridge emphasizing 5; positional correction processing 18; and collation processing 19 further comprising steps of search collation minutia selecting 7, local area setting 8, search collation minutia searching 9, neighboring collation minutia selecting 10, neighboring collation minutia searching 11, relation searching 12, scoring 13, frequency judging 14, scoring 15, threshold judging 16 and collation result outputting 17.

Operations of the fingerprint image inputting step 1 and the preprocessing 17 are identical with the corresponding operations in the above described record registering phase.

At the center aligning step 6 of the positional correction processing 18, aligning can be achieved by shifting a 5×5 directional data pattern, obtained as the aligning data 28 generated at the aligning information generating step 22 of the registering phase, on the directional data of the input fingerprint to find out the best fitting position.

The fingerprint image having gone through aligning in this manner is inputted to the collation processing step 19.

At the search collation minutia selecting step 7, the contents of the collation minutia record list 27 are referred to select collation minutia records in succession.

It is now supposed that a collating minutia record 1 has been selected.

Then at the local area setting step 8 a position is set on the input fingerprint image corresponding to the position of collation (X, Y). It is then determined whether the input fingerprint image set in this manner has a collation minutia corresponding to the collation minutia of the collation minutia record 1.

At the neighboring collation minutia selecting step 10, a collation minutia record is searched having a collation minutia number j indicated by a neighboring collation minutia number in the collation minutia record 1 selected at the selecting step 7.

Then at the searching step 11 it is determined whether there is a collation minutia in the position or the input fingerprint image indicated by a collation minutia in the record j.

Next at the relation searching step 12, reference is made to a relation field in the record 1 to check if the number of ridges on the segment linking two corresponding points in the record 1 and the record j of the input fingerprint image is equal to the number of ridges stated in the field referred to.

At the scoring step 13, the degree of matching is weighted with the difference between the detected relation and the relation in the collation minutia record list 27. If, for instance, the difference is great, the score will be reduced, if the difference is small, the score will be raised.

At the prescribed frequency judging step 14, the prescribed frequency is multiplied by four because four quadrants are searched. To achieve a higher level of accuracy, however, the prescribed frequency may be a power of four.

At the scoring step 15 four approximate collation minutiae are detected for a collation minutia which is the single original, and one collation minutia record is checked as to whether the collation minutia, which is made the original, is identical with the registered collation minutia in accordance with a predetermined value of the total sum of relation-based weights.

At the threshold judging step 16 it is determined whether the number of collation minutia records ascertained at the scoring step 14 has reached a prescribed number.

As regards this number, the number of identical minutiae may be "20" for instance, or that of unidentical ones, say, "5".

In this way are achieved personal fingerprint data generation and collation for collation minutia including non-characteristic minutiae.

Regarding the speed of image processing, search/collation processing of non-characteristic minutiae can be executed as fast as that of characteristic minutiae.

A second preferred embodiment of the present invention, utilizes the example of the first embodiment modified by using a table of random numbers. The apparatus of the second embodiment separates the image processing side and the IC card from each other, and will be described in detail below with reference to a drawing.

Referring to FIG. 9, in the second preferred embodiment of the invention, a collation command is first generated in an image processing unit 31 (step 32). In response to this collation command aligning data 28 is output which constitute part of the personal fingerprint data in the IC card 30. As in the first preferred embodiment of the present invention, fingerprint inputting 1, preprocessing 17, and positional correction processing 18 are performed in the image processing unit 31. This positional correction processing 18 utilizes the aligning data 28 provided from the IC card 30.

This second embodiment will be described in detail below with respect to its second feature, the use of random numbers in characteristic minutia searching, as well as the first feature, the use of the IC card 30.

First, a random number table 34 is accessed according to a few of the least significant bits in a timer 33 built into the IC card 30. Next, according to a random number read out of this random number table 34, a collation minutia list 27 is accessed to read out a collation minutia record. At a search collation minutia selecting step 7, the position (X, Y) and direction of the collation minutia are determined on the basis of the contents of the collation minutia record which has been read out and supplied to the image processing unit 31. As in the first embodiment, a local area setting step 8 and a search collation minutia searching step 9 are executed in the image processing unit and the type of the collation minutia, as the result of search, is sent to the IC card 30. In the IC card 30, the same record as that referenced at the foregoing selecting step 7 is referenced on the basis of the result of search; the position and direction of a neighboring collation minutia are determined, and provided to the image processing unit. As in the first embodiment, a neighboring collation minutia searching step 11 and a relation searching step 12 are executed in the image processing unit on the basis of the position and direction of the neighboring collation minutia, and the type of the collation minutia and the relation, as the result of search, are sent to the IC card 30. In this manner, collation can be executed without having to inform the image processing side of the type of the collation minutia and the relation in advance.

At a scoring step 13, a frequency judging step 14 and another scoring step 15 in the IC card 30, the same processings are achieved respectively as in the first preferred embodiment.

Because the image processing unit 31 in this second embodiment cannot determine whether registered characteristic minutiae are present in the positions inquired about, it cannot infer the contents of the registered collation minutia list from the inquiry. However, even though inference from the inquiry is not possible, the combination of the inquiry and the result of collation using the reply thereto may readily allow the information to leak, depending on the method of collation. For instance, if only one minutia is inquired about and the result of collation as to its legitimacy alone is referenced, it will be known whether the response from the image processing unit 31 was as stated in the collation minutia record list. If the result of collation is considered affirmative only when all the replies to the inquiry are affirmative, an authorized third party will know the affirmative answer to every item of the inquiry. Regarding reliability, conversely, noise in the input image may invite a failure in identifying the right person. In view of this problem, at step 16 of the first preferred embodiment of the invention, a threshold is prescribed for the number of affirmative replies at or beyond which collation is deemed affirmative, and another threshold is provided for negative replies at or beyond which the person cannot be legitimately identified.

If, at the time the number of either positive or negative replies has reached its threshold, the fact of its having been reached is made known to the image processing unit 31, it will be known that the reply to the last question has brought the number of positive or negative replies to its threshold. Thus, if the person is identified, the final reply must have been positive or if not, it must have been negative. This leaves a problem in keeping the secrecy of the list of characteristic minutiae concerning the final question.

At a prescribed frequency step 20 in the second preferred embodiment of the present invention, the IC card 30 makes inquiries to, and receives replies from, the image processing unit 31 a prescribed number of times beyond the threshold about the positions and directions of collation minutiae and neighboring collation minutiae, and only then completes the collating process by informing the image processing unit 31 of the result of collation. However, if there is neither fear of unauthorized access by a third party nor the need to keep the list of collation minutiae secret from the legitimate person to be identified, it will be a waste of time and communication capacity to continue making inquiries until the prescribed number is reached even though the threshold number of positive replies has been arrived at. In this case, the IC card 30 will send the result of collation to the image processing unit 31 when the threshold number of positive replies has been reached or, if the number of negative answers exceeds its threshold, will let inquiries continue to be made until their prescribed number is reached.

The present invention has the advantage of improving the collation rate by using not only characteristic minutae but also non-characteristic minutae for the collation process. It has the further advantage that the image processing unit does not know whether the collation minutae searched for are characteristic or non-characteristic and therefore cannot recognize genuine characteristic minutiae, neighboring characteristic minutiae, or relations among them, because the IC card has the list of collation minutia records. It has the further advantage of being able to keep the secrecy of the contents of the collation minutia record list more effectively by utilizing random numbers for accessing the collation minutia record list in the IC card, using a different collation minutia record list every time, and setting the frequency of placing inquiries to the image processing unit about collation minutia information at any convenient number greater than the threshold.

What is claimed is:

1. A method for the matching of input fingerprints with stored records of identified fingerprints, said records comprising collation minutiae of both characteristic and non-characteristic types, comprising:
    an inputting step to enter an input fingerprint image comprising collation minutiae; and
    a collating step to check collation minutiae of said input fingerprint image with said collation minutiae already registered in a list of collation minutiae records, said collating step comprising a search collation minutiae selecting step for selecting specific collation minutiae records in succession by referring to said list of collation minutiae records, a local area setting step for setting a position on said input fingerprint image corresponding to a collation position, a searching step for searching collation minutiae, and a detecting step for detecting both characteristic and non-characteristic minutiae.

2. An apparatus for the matching of fingerprints comprising:
    an IC card having minutiae record holding means for holding collation minutiae comprising both characteristic and non-characteristic minutiae;
    an image processing unit, having collation minutiae searching means, for processing images; and
    sending means within said IC card for sending collation minutiae information other than information regarding a type of collation minutiae from said minutiae record holding means to said image processing unit, wherein
    said image processing unit having collation minutiae searching means is responsive to said collation minutiae information from said sending means of said IC card for searching said collation minutiae and sending a result of said search to said IC card.

3. An apparatus for the matching of fingerprints, as claimed in claim 2, wherein said minutiae record holding means in said IC card is accessed by random numbers.

4. An apparatus for the matching of fingerprints, as claimed in claim 2, wherein said IC card sets the permissible frequency of sending by said sending means in response to the result of a search from the collation minutia searching means of said image processing unit at any desired value greater than a predetermined level.

* * * * *